No. 736,827. Patented August 18, 1903.

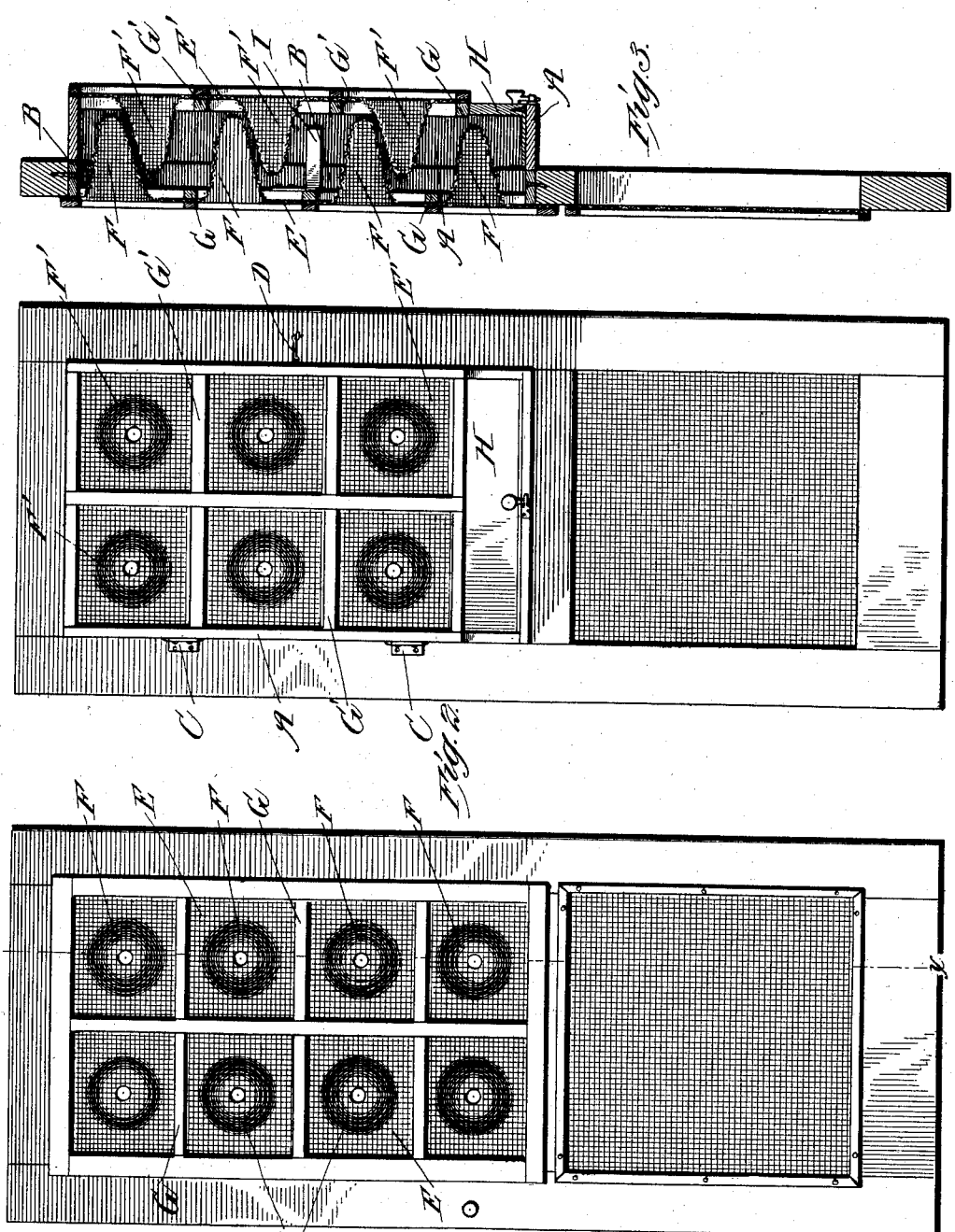

UNITED STATES PATENT OFFICE.

EDWIN FRANKLIN DAVISON, OF MARYSVILLE, WASHINGTON.

FLY-TRAP.

SPECIFICATION forming part of Letters Patent No. 736,827, dated August 18, 1903.

Application filed May 7, 1903. Serial No. 156,109. (No model.)

*To all whom it may concern:*

Be it known that I, EDWIN FRANKLIN DAVISON, of Marysville, in the county of Snohomish and State of Washington, have invented certain new and useful Improvements in Fly-Traps, of which the following is a specification.

This invention relates to fly-traps adapted to door and window screens.

The invention consists in a new and novel trap specially designed to form a part or the whole of the upper panel of a screen-door. It is also adapted to be used in connection with window-screens.

In order to enable others to make and use my invention, I will now proceed to describe it in detail with reference to the accompanying drawings, which form a part of this specification, and in which—

Figure 1 is a view showing a screen-door in front elevation, illustrating my invention in use. Fig. 2 is a similar view showing the rear or inner side of the door, and Fig. 3 is a vertical sectional view taken on line $x\ x$ of Fig. 1.

In carrying out my invention I employ two frames A and B of any desired size, adapted to form a part or the whole of the upper panel of a screen-door. These frames A and B may have hinged connection at one edge, as at C, and be provided with some suitable fastening device at the other edge, as at D. The frame B may fit wholly within the door and forms the fixed member of the trap-framing and is adapted to support the hinged member or frame A.

The outer face of the frame B is covered with wire-screen E, having a series of inwardly-projecting funnel-shaped inlets F. These inlets may be made by suitably depressing the fabric or formed at the time the fabric is woven. To provide a support for the screen E, vertical and horizontal slats G may be utilized, though the latter are deemed necessary only where the frame is of size conforming to the whole upper panel of a large door.

The rear or inner side of the frame A is provided with a screen-covering E', funnel-shaped inlets F'', and, if desired, vertical and horizontal slat-supports G', similar to the frame B. The inlets F and F'' project toward each other, but are out of alinement, as shown in Fig. 3 of the drawings.

At the lower end of the frame A, I provide a removable pan or drawer H, adapted to catch and hold the dead flies or insects.

Within the trap, between the screens E E', I support a pan I, adapted to contain a liquid or other insecticide.

While I have only described my fly-trap in connection with a screen-door, obviously the frames A and B may be adapted to and form a part or the whole of a window-screen without departing from the spirit of my invention.

With a trap such as I have hereinbefore described in detail it is apparent that any flies entering through the outer funnel-shaped inlets F will be caged between the two screens E E', and that when dead they will fall into the pan or drawer H, which latter may be withdrawn for removing them. In addition to trapping flies and insects attempting to enter the house it is apparent that any flies and insects attempting to pass out from the inside of the door will be caught in the same way after passing through a funnel F''.

In connection with the above description I would call particular attention to the peculiar arrangement of the funnel-shaped openings F F''. In Fig. 3 of the drawings it will be noticed that they project out of alinement inwardly within the trap and that those on one screen extend beyond those on the opposite screen. With such a construction the reduced passage-ways through the small end of the funnels are located better adapted to prevent caged insects from effecting an escape from the trap.

Having thus fully described my invention, what I claim as new, and desire to secure by Letters Patent, is—

The combination in a fly-trap of a two-part frame hinged together, screen-coverings on opposite sides of said frame, inwardly-projecting funnel-shaped depressions or passage ways through the said coverings arranged out of alinement, and with the inner end of the depressions in one covering extending beyond the inner end of the depression in the other covering, slatted support for the said screen-covering, a drawer at the lower end of one hinged member of the frame, means within the trap for holding an insecticide and means for locking the hinged member of the trap-frame substantially as described.

EDWIN FRANKLIN DAVISON.

Witnesses:
S. M. LINDLEY,
THURZA J. DAVISON.